US012584024B2

(12) United States Patent
Saleem

(10) Patent No.: US 12,584,024 B2
(45) Date of Patent: Mar. 24, 2026

(54) FLOWABLE LUMINESCENT COATING COMPOSITION AND USE THEREOF

(71) Applicant: Imam Abdulrahman Bin Faisal University, Dammam (SA)

(72) Inventor: Muhammad Saleem, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 155 days.

(21) Appl. No.: 18/421,109

(22) Filed: Jan. 24, 2024

(65) Prior Publication Data

US 2025/0236740 A1    Jul. 24, 2025

(51) Int. Cl.
*C09D 5/22* (2006.01)
*B32B 15/082* (2006.01)
(Continued)

(52) U.S. Cl.
CPC .............. *C09D 5/22* (2013.01); *B32B 15/082* (2013.01); *B32B 15/09* (2013.01); *B32B 27/308* (2013.01); *B32B 27/36* (2013.01); *C09D 7/20* (2018.01); *C09D 7/48* (2018.01); *C09D 7/61* (2018.01); *C09D 7/63* (2018.01); *C09D 7/69* (2018.01);
(Continued)

(58) Field of Classification Search
CPC ... C09D 5/22; C09D 7/20; C09D 7/48; C09D 7/61; C09D 7/63; C09D 7/69; C09D 7/40; C09D 163/00; B32B 15/082; B32B 15/09; B32B 27/308; B32B 27/30; B32B 27/36; B32B 2255/10; B32B 2255/26; B32B 2590/00; E01F 9/617; E01F 9/615; G08G 1/09; G09F 13/20; C08K 5/0016; C08K 5/00; C08K 2003/2227; C08K 3/22

USPC ....... 40/541, 542, 543, 544, 582; 252/501.1, 252/582, 585
See application file for complete search history.

(56) References Cited

U.S. PATENT DOCUMENTS

| | | | |
|---|---|---|---|
| 6,905,634 B2 | 6/2005 | Burnell-Jones | |
| 2001/0010367 A1* | 8/2001 | Burnell-Jones | C09K 11/02 |
| | | | 252/301.36 |
| 2017/0002264 A1 | 1/2017 | Kawataki et al. | |

FOREIGN PATENT DOCUMENTS

| | | |
|---|---|---|
| EP | 3 770 233 A1 | 1/2021 |
| RU | 2 421 499 C1 | 6/2011 |

OTHER PUBLICATIONS

Al-Qahtani et al. ; Development of silica-coated rare-earth doped strontium aluminate toward superhydrophobic, anti-corrosive and long-persistent photoluminescent epoxy coating, vol. 37, Issue 3 ; Jan. 18, 2022 ; Abstract Only ; 1 Page.
(Continued)

*Primary Examiner* — Justin V Lewis
(74) *Attorney, Agent, or Firm* — Oblon, McClelland, Maier & Neustadt, L.L.P.

(57) ABSTRACT

A flowable luminescent coating composition includes a curable thermoset resin, a filler material, two or more solvents, a plasticizer, a stabilizer, phosphorescent aluminate particles. The phosphorescent aluminate particles are present in the flowable luminescent coating composition at a concentration of 30 to 70% by weight of the composition. The composition in a cured form has an intensity of glow of 1-50 candelas per square meter for a period of 0.1 to 2 hours upon excitation with ultraviolet light for 5 to 120 seconds. A glow-in-the-dark (GiD) film, a GiD traffic sign, and a GiD system.

20 Claims, 7 Drawing Sheets

(51) Int. Cl.

| | | |
|---|---|---|
| *B32B 15/09* | (2006.01) | |
| *B32B 27/30* | (2006.01) | |
| *B32B 27/36* | (2006.01) | |
| *C08K 3/22* | (2006.01) | |
| *C08K 5/00* | (2006.01) | |
| *C09D 7/20* | (2018.01) | |
| *C09D 7/40* | (2018.01) | |
| *C09D 7/48* | (2018.01) | |
| *C09D 7/61* | (2018.01) | |
| *C09D 7/63* | (2018.01) | |
| *C09D 163/00* | (2006.01) | |
| *E01F 9/615* | (2016.01) | |
| *G08G 1/09* | (2006.01) | |
| *G09F 13/20* | (2006.01) | |

(52) U.S. Cl.
CPC ............ *C09D 163/00* (2013.01); *E01F 9/617* (2016.02); *G08G 1/09* (2013.01); *G09F 13/20* (2013.01); *B32B 2255/10* (2013.01); *B32B* *2255/26* (2013.01); *B32B 2590/00* (2013.01); *C08K 2003/2227* (2013.01); *C08K 5/0016* (2013.01)

(56) References Cited

OTHER PUBLICATIONS

Li et al. ; Morphology and photoluminescence properties of phenolic epoxy resin coating on KH550-modified SrAl204: Eu2+, Dy3+ powder in the presence of triarylsulfonium hexafluoroantimonate ; Journal of Coatings Technology and Research, 13 ; Aug. 29, 2016 ; Abstract Only ; 2 Pages.

Munikanan et al. ; Strontium Aluminate Compound as Road Line Materials Application (Penggunaan Strontium Aluminate Compound sebagai Bahan Jalur Jalan) ; Jurnal Kejuruteraan SI 4(2) ; Oct. 31, 2021 ; 5 Pages.

* cited by examiner

FLOWABLE LUMINESCENT COATING COMPOSITION AND USE THEREOF

BACKGROUND

Technical Field

The present disclosure is directed to a flowable luminescent coating composition, a glow-in-the-dark (GiD) film made therefrom, and method for producing the GiD film, a GiD system, particularly to a GiD system containing the Gid film.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Traffic signs, commonly utilized for road safety, have undergone evolutionary changes to accommodate the increasing demands of a growing and dynamic population. With the rise in vehicle and the expansion of intricate road networks, the need for more visible traffic signage has increased. Therefore, the development of illumination methods has become a heightened necessity to enhance the visibility of these signs, especially during nighttime or in low-light conditions.

Traffic signs are traditionally classified as either active or passive. Active signs, including directly or solar-powered LED signs, are engineered to be highly visible, even in low-light conditions. However, active signs require a constant external power source are comparatively less power efficient. On the contrary, passive signs, such as reflective signs, exemplified by reflective signs, lack their own light source and depend on external illumination, such as vehicle headlights, to ensure visibility.

Reflective signs, valued for their low cost and simplicity, have limitations that may affect their efficacy in varied lighting and weather conditions. The reflective signs traditionally employ reflective/glow materials to enhance their visibility. These materials, designed to reflect light from sources such as vehicle headlights, ensure that traffic signs are visible at night or in low-light conditions. However, the effectiveness of these reflective materials is subject to certain limitations. A notable drawback is their inherently low luminance. Unlike active lighting solutions, reflective materials do not emit light but merely reflect it, which can result in less effective visibility under certain conditions, particularly when external light sources are weak or absent.

US20170002264A1 describes a method for creating a mechanoluminescent material. This process involves mixing a phosphate compound with europium-activated strontium aluminate particles to form a slurry, grinding the slurry, and then drying it. However, US20170002264A1 does not describe (i) strontium aluminate particles having an average particle size of 1-15 μm, and (ii) the luminescent coating composition with a glow intensity of 1-50 candelas per square meter by reflecting an excitation light. Additionally, the flowable luminescent coating composition of the present disclosure does not contain a phosphate compound.

U.S. Pat. No. 6,905,634B2 describes a heat curable luminescent polymer suitable for screen printing. This polymer, made from unsaturated polyesters, fillers, and phosphorescent pigments, exhibit photoluminescence, as well as thermostimulation of afterglow and electroluminescent properties. However, U.S. Pat. No. 6,905,634B2 does not describe (i) strontium aluminate particles having an average particle size of 1-15 μm, and (ii) the luminescent coating composition with a glow intensity of 1-50 candelas per square meter by reflecting an excitation light.

EP3770233A1 discloses a luminescent composition, and a method of making the composition. The luminescent composition contains a europium-activated strontium aluminate pigment having a particle size of 20 to 75 μm, and a solvent, e.g., styrene, distyrene, and acetone. However, EP3770233A1 does not describe (i) strontium aluminate particles having an average particle size of 1-15 μm, (ii) the luminescent coating composition with a glow intensity of 1-50 candelas per square meter by reflecting an excitation light, and (iii) a curable thermoset resin.

RU2421499C1 discloses a luminescent composition containing a luminescent pigment, and a polymeric binder. The luminescent pigment may be activated with at least one rare earth element, and the luminescent composition may further include a filler, a plasticizer, and a solvent. However, RU2421499C1 does not describe (i) strontium aluminate particles having an average particle size of 1-15 μm, and (ii) the luminescent coating composition with a glow intensity of 1-50 candelas per square meter by reflecting an excitation light.

Qahtani et al. (*Luminescence*, 2022) discloses a luminescent composition containing lanthanide-doped aluminate nanoparticles, an epoxy resin, and a silica filler. However, Qahtani does not describe (i) strontium aluminate particles having an average particle size of 1-15 μm, and (ii) the luminescent coating composition with a glow intensity of 1-50 candelas per square meter by reflecting an excitation light.

Li et al. (*JCTR*, 2016) discloses a luminescent composition containing amino silane-modified strontium aluminate particles, a phenolic epoxy resin, and a catalyst. However, Li does not describe (i) strontium aluminate particles having an average particle size of 1-15 μm, and (ii) the luminescent coating composition with a glow intensity of 1-50 candelas per square meter by reflecting an excitation light.

Munikanana et al. (*Journal of Engineering*, 2021) discloses a luminescent composition containing strontium aluminate particles, and a thermoplastic powder. However, Munikanana does not describe (i) strontium aluminate particles having an average particle size of 1-15 μm, (ii) rare earth-elements doped strontium aluminate particles and (iii) the luminescent coating composition with a glow intensity of 1-50 candelas per square meter by reflecting an excitation light.

The drawbacks of each of the compositions and methods described above indicate that there is still a need for a glow-in-the-dark film made from a flowable luminescent coating composition to enhance the visibility of a GiD traffic sign. More importantly, the challenge is that such compositions and methods should be cost-effective and rapid to attract industries to adopt these processes. By overcoming the drawbacks of traditional reflective materials, the present disclosure proposes to enhance the safety and visibility of traffic signs, thereby contributing to a safer and more efficient road network.

Accordingly, it is one object of the present disclosure to provide a flowable luminescent coating composition. A second objective of the present disclosure is to provide a glow-in-the-dark (GiD) film. A third objective of the present disclosure is to provide a GiD traffic sign in the presence of the GiD film. The GiD traffic sign provides reliable and uniform illumination regardless of external factors, for traffic sign use. A fourth objective of the present disclosure is to provide a GiD system containing the GiD traffic sign.

SUMMARY

In an exemplary embodiment, a flowable luminescent coating composition is provided. The flowable luminescent coating composition contains a curable thermoset resin, a filler material, two or more solvents, a plasticizer, a stabilizer, and phosphorescent aluminate particles. In some embodiments, the phosphorescent aluminate particles are present in the flowable luminescent coating composition at a concentration of 30 to 70 wt. % based on a total weight of the flowable luminescent coating composition. In some embodiments, the phosphorescent aluminate particles and the filler material are suspended in a liquid mixture comprising the curable thermoset resin, the two or more solvents, the plasticizer, and the stabilizer. In some embodiments, the flowable luminescent coating composition in a cured form has an intensity of glow of 1-50 candelas per square meter for a period of 0.1 to 2 hours upon excitation with ultraviolet (UV) light for 5 to 120 seconds.

In some embodiments, the phosphorescent aluminate particles have an average particle size of 5 to 25 micrometers (μm).

In some embodiments, the phosphorescent aluminate particles contain a rare earth element doped strontium aluminate.

In some embodiments, the rare earth element is at least one selected from the group consisting of cerium, dysprosium, europium, and neodymium.

In some embodiments, the rare earth element doped strontium aluminate further contains a promoter selected from the group consisting of boron, lithium, sodium, potassium, magnesium, calcium, barium, chromium, and manganese.

In some embodiments, the curable thermoset resin contains an epoxy component and an amine curing agent.

In some embodiments, the epoxy component contains at least one resin selected from the group consisting of a bisphenol A epoxy resin, a bisphenol F epoxy resin, a novolak epoxy resin, an aliphatic epoxy resin, a glycidylamine epoxy resin, and an epoxidized vegetable oil.

In some embodiments, the amine curing agent contains at least one selected from the group consisting of piperazine, aminoethylpiperazine, pentaethylenehexamine (PEHA), ethylenediamine, ethyleneimine, diethylenetriamine (DETA), hexaethyleneheptamine (HEHA), tetraethylenepentamine (TEPA), and triethylenetetramine (TETA).

In some embodiments, a volume ratio of the epoxy component and the amine curing agent is in a range of 1:1 to 10:1.

In some embodiments, the filler material is at least one selected from the group consisting of fused silica, crystalline silica, glass powder, alumina, calcium carbonate, barium sulfate, barium titanate, talc, clay, magnesium carbonate, aluminum oxide, aluminum hydroxide, magnesium hydroxide, and mica.

In some embodiments, each of the two or more solvents are independently selected from the group consisting of a ketone solvent, an ester solvent, an alcohol solvent, an amide solvent, an ether solvent, an aromatic hydrocarbon solvent, and water.

In some embodiments, the two or more solvents contain a benzene solvent and water. In some embodiments, a volume ratio of the benzene solvent and water is in a range of 50:1 to 5:1.

In some embodiments, the plasticizer is at least one selected from the group consisting of a phthalate-based plasticizer, a polyol-based plasticizer, and a citrate-based plasticizer.

In some embodiments, the stabilizer is at least one selected from the group consisting of an antioxidant, a light stabilizer, and a heat stabilizer.

In another exemplary embodiment, a glow-in-the-dark (GiD) film is provided. The GiD film contains the flowable luminescent coating composition in a cured form.

In yet another exemplary embodiment, a GiD traffic sign is provided. The GiD traffic sign contains a polymer film at least partially covering a surface of a metal substrate. The GiD traffic sign further contains a binder layer at least partially covering a surface of the polymer film. The GiD traffic sign further contains the GiD film at least partially covering a surface of the binder layer.

In still another exemplary embodiment, a GiD system is provided. The GiD system contains the GiD traffic sign. The GiD system further contains a plurality of solar panels. In some embodiments, the plurality of solar panels are supported on a base plate. The GiD system further contains a rechargeable battery pack. The GiD system further contains a microcontroller. The GiD system further contains a plurality of switches. The GiD system further contains a plurality of UV light sources. In some embodiments, the plurality of UV light sources are in optical communication with the GiD traffic sign.

In some embodiments, each of the plurality of solar panels is operatively connected to the rechargeable battery pack. In some embodiments, the rechargeable battery pack is operatively connected to the microcontroller.

In some embodiments, each of the plurality of UV light sources is operatively connected to the microcontroller via each of the plurality of switches. In some embodiments, the microcontroller comprises a memory for saving or installing an application program, or a software program. In some embodiments, the application program or the software program from an internet or a cloud server is downloaded for controlling ON and OFF of each of the plurality of switches.

In some embodiments, each of the plurality of UV light sources has a wavelength of maximum intensity in a range of 365 and 395 nanometers (nm).

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
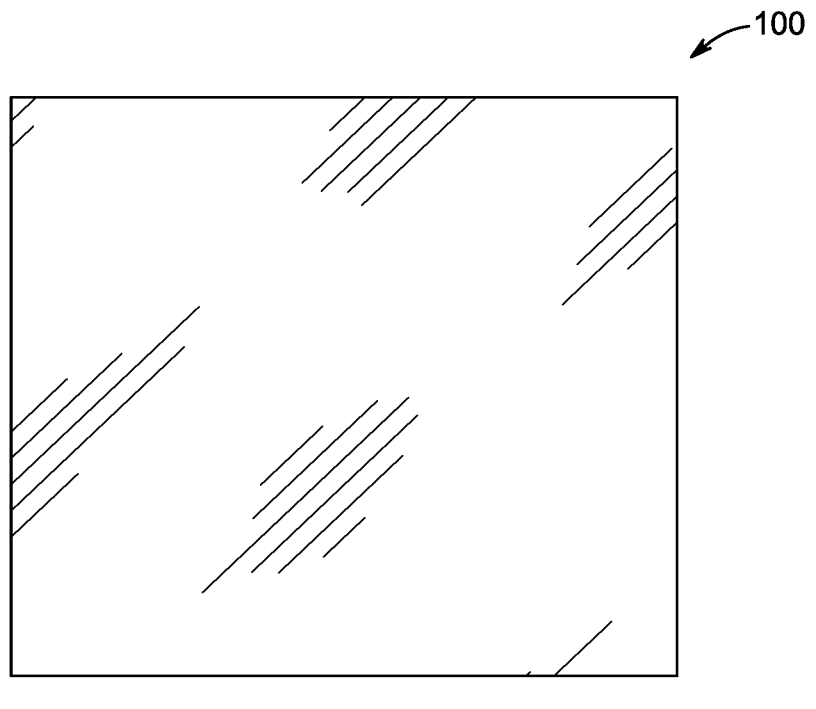
FIG. 1 is an exemplary diagram of a glow-in-the-dark (GiD) film, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

Aspects of this disclosure are directed to a flowable luminescent coating composition providing a solution for enhancing road safety through innovative traffic sign illumination. The flowable luminescent coating composition, when cured, exhibits a glow for night-time visibility. The present disclosure also provides a glow-in-the-dark (GiD) film comprising the flowable luminescent coating composition. The present disclosure further provides a GiD traffic sign comprising the GiD film, with a layered structure for durability and visibility. The present disclosure further provides a GiD system that integrates the GiD traffic sign, and leverages solar energy to generate ultraviolet (UV) light to "charge" the GiD film for ensuring continuous operation. The flowable luminescent coating composition of the present disclosure uses strontium aluminate, a non-toxic material, which when implemented in combination with the UV light, enhances and maintains the glow intensity and duration of traffic signs.

The flowable luminescent coating composition (hereinafter, interchangeably, referred to as "composition") of the present disclosure is a specialized material designed to provide advanced luminescent properties while maintaining practical application characteristics. The luminescent properties of the composition serve a function in enhancing visibility and safety, especially in low-light environments. The composition is configured to be easily applied to various surfaces, forming a durable and uniform layer that exhibits high-intensity luminescence under dark conditions. The flowability of the composition shows its ease of application, allowing it to be used in diverse settings, including complex geometries or large surface areas. The composition is designed with properties to enable it to withstand various environmental factors, ensuring long-term performance and reducing the need for frequent maintenance or replacements.

As used herein, the terms "luminescent" or "luminescence" describe a material that emits light upon excitation from a non-thermal source such as chemical reactions, electrical energy, electromagnetic rays, and mechanical stress, etc. There are different types of luminescence categorized by excitation source, e.g., bioluminescence originated from biochemical reactions in a living organism, mechanoluminescence generated by mechanical stress, and photoluminescence resulted from absorption of photons. Similar to fluorescence, phosphorescence is a form of photoluminescence involving relative slow emission of light by a substance that has absorbed light or other electromagnetic radiation. However, unlike fluorescence, where the substance would cease to glow almost immediately upon removal of the excitation source, phosphorescent materials would continue to glow and emit light for some time after the radiation source has been turned off. Hence, it is a persistent phenomenon compared to fluorescence. Phosphorescence is often the mechanism used for "glow-in-the-dark" (GiD) materials, which are charged by exposure to light. Unlike the relatively swift reactions in fluorescence such as those seen in a common fluorescent tube, GiD materials store the absorbed energy for a longer time at a metastable state. A phosphorescence lifetime is the average time needed for the stored energy to get released in a phosphorescent material.

In particular, for purposes of the present disclosure, the flowable luminescent coating composition has the ability to emit an enhanced and prolonged glow. Thus, a product, such as a film or cured composition, made therefrom exhibits illumination without relying on continuous energy sources. Such a characteristic is beneficial in traffic safety and signage, where consistent and reliable visibility is important. For such purposes, the composition is formulated to provide a long-lasting luminescent effect, which is important for applications such as traffic sign illumination.

According to the first aspect, the present disclosure relates to a flowable luminescent coating composition. The flowable luminescent coating composition includes a curable thermoset resin. The curable thermoset resin forms a primary matrix of the composition, offering properties such as structural stability, durability, and resistance to environmental factors. In some embodiments, the thermosetting nature of the curable thermoset resin ensures that once cured, the composition, when applied, retains its shape and properties even under varying temperatures, making it ideal for outdoor applications. The ability of the curable thermoset resin to cure into a solid form ensures that the luminescent properties of the composition are preserved over time and under varying environmental conditions.

In some embodiments, the flowable luminescent coating composition further includes a filler material. The inclusion of the filler material serves multiple purposes. The filler material may enhance the mechanical properties of the composition, such as strength and abrasion resistance, as may be desired for certain applications where the composition may be subjected to physical wear and tear. The filler material may also contribute to the overall volume of the composition, enabling cost-effectiveness by reducing the amount of more expensive components required. Depending on the type, the filler material may also impart additional benefits, such as improving thermal stability or modifying the visual appearance of the composition.

In some embodiments, the flowable luminescent coating composition further includes two or more solvents. These solvents may play a role in adjusting the flowability and application properties of the composition. Based on selecting and balancing of different solvents, the composition may be designed to have a desired viscosity for specific application methods, such as brushing, spraying, or others. The solvents may also influence drying time and curing process, to help achieve a uniform and effective luminescent coating formed using the composition. Further, the choice of solvents may also impact the overall environmental friendliness of the composition, which is an important consideration.

In some embodiments, the flowable luminescent coating composition further includes a plasticizer. The plasticizer may be added to enhance flexibility and reduce brittleness of a coating formed using the composition. This is particularly advantageous in outdoor or dynamic environments where such coating may be subjected to mechanical stresses or temperature-induced expansion and contraction. Herein, the plasticizer ensures that the coating maintains its integrity and adherence to the substrate without cracking or flaking, thereby preserving its functional and aesthetic properties over an extended period.

In some embodiments, the flowable luminescent coating composition further includes a stabilizer. The stabilizer acts as an additive that protects the integrity of a coating formed using the composition. The stabilizer prevents degradation due to factors like heat, oxidation, and the like, which are common challenges for outdoor materials. Thereby, the stabilizer may help to prolong lifespan of the coating, ensuring that its luminescent properties remain effective and consistent over an extended period of time.

In some embodiments, the flowable luminescent coating composition further includes phosphorescent aluminate particles (hereinafter, sometimes, referred to as "particles"). These phosphorescent aluminate particles provide the luminescent properties to a coating formed using the composition. These particles, when exposed to ultraviolet (UV) light, can store and later emit light, a process known as phosphorescence. This ability to glow in the dark after exposure to light sources makes these particles suitable in applications for providing light, especially in low-light conditions. Specifically, the inclusion of the phosphorescent aluminate particles in the flowable luminescent coating composition of the present disclosure allows for creation of surfaces that can emit light for extended periods, enhancing visibility and contributing to safety in various contexts, such as, but not limited to, traffic signs.

In some embodiments, the phosphorescent aluminate particles are present in the flowable luminescent coating composition at a concentration of 30 to 70 wt. % based on a total weight of the flowable luminescent coating composition. In example embodiments, the phosphorescent aluminate particles may have the concentration ranging from 35 to 65 wt. %, preferably 40 to 60 wt. %, preferably 45 to 55 wt. %, or even more preferably about 50 wt. %, based on the total weight of the composition without any limitations. With such concentration, the phosphorescent aluminate particles provide an enhanced and long-lasting glow, as required for practical applications. In some embodiments, the phosphorescent aluminate particles and the filler material are suspended in a liquid mixture comprising the curable thermoset resin, the two or more solvents, the plasticizer, and the stabilizer.

As used herein, the terms "flowable," or "flowability" generally refers to the characteristic of a substance or material that can flow or move easily. A flowable material is one that has the ability to deform and change shape when subjected to external forces, such as pouring, pumping, or other forms of motion. In the present disclosure, the flowable luminescent coating composition generally refers to that the composition can flow or move easily at a temperature of 0 to 80° C., preferably 5 to 60° C., preferably 10 to 40° C., or even more preferably 15 to 20° C. Other ranges are also possible.

In some embodiments, the flowability of the flowable luminescent coating composition of the present disclosure may be determined by ASTM D5125 and ASTM D7836 (Standard Test Method for Viscosity of Paints and Related Materials by ISO Flow Cups, ASTM D5125; and Standard Test Methods for Measurement of Yield Stress of Paints, Inks and Related Liquid Materials, each of which are incorporated herein by reference in their entireties).

According to still further features in the described preferred embodiments, the degree of flowability may be defined by viscosity. In some embodiments, the flowable luminescent coating composition has a viscosity in a range of 200 to 8000 centipoise (cP), preferably 500 to 7000 cP, preferably 800 to 6000 cP, preferably 1100 to 5000 cP, preferably 1400 to 4000 cP, or even more preferably 1700 to 3000 cP measured at a temperature of 0 to 80° C., preferably 5 to 60° C., preferably 10 to 40° C., or even more preferably 15 to 20° C. Other ranges are also possible.

According to still further features in the described preferred embodiments, the degree of flowability may be defined by yield stress. In some embodiments, the flowable luminescent coating composition has a yield stress in a range of 10 to 10,000 pascals (Pa), preferably 100 to 8000 Pa, preferably 300 to 6000 Pa, preferably 500 to 4000 Pa, preferably 700 to 3000 Pa, preferably 900 to 2000 Pa, or even more preferably 1100 to 1500 Pa measured at a temperature of 0 to 80° C., preferably 5 to 60° C., preferably 10 to 40° C., or even more preferably 15 to 20° C. Other ranges are also possible.

In some embodiments, the flowable luminescent coating composition in a cured form has an intensity of glow of 1-50 candelas per square meter, preferably 5 to 45 candelas per square meter, preferably 10 to 40 candelas per square meter, preferably 15 to 35 candelas per square meter, preferably 20 to 30 candelas per square meter, or even more preferably about 20 candelas per square meter, for a period of 0.1 to 2 hours, preferably 0.5 to 1.5 hours, or even more preferably about 1 hour, upon excitation with UV light for 5 to 120 seconds, preferably 10 to 110 seconds, preferably 30 to 90 seconds, preferably 50 to 70 seconds, or even more preferably about 60 seconds. Other ranges are also possible. The provided concentration of the phosphorescent aluminate particles helps achieve this luminance, imparting a coating formed using the composition sufficiently visibility in low-light conditions. The ability of these particles to maintain their glow for 0.1 to 2 hours, or even more preferably about 1 hour after 5 to 120 seconds, or even more preferably 40 to 80 seconds of UV light exposure allows for the use of the composition for forming the coatings to be implemented in applications like traffic sign illumination, where prolonged visibility is required for safety. Other ranges are also possible.

As used herein, an average particle size refers to the longest linear dimension of a particle. In an embodiment, the phosphorescent aluminate particles have an average particle size of 1 to 50 micrometers ($\mu$m), preferably 2 to 40 $\mu$m, preferably 3 to 30 $\mu$m, or even more preferably 4 to 20 $\mu$m. Other ranges are also possible. This size specification for the phosphorescent aluminate particles to have the average particle size in range of, e.g., preferably 5 to 25 $\mu$m is used to ensure superior immersion and dispersion within the composition, providing a homogeneous mixture. The uniform distribution of these particles also helps in achieving a consistent luminescent effect. Further, this size range may optimize the luminescent properties of these particles. It may be understood that these particles within the specified size range effectively absorb and emit light, contributing to consistent glow. In example embodiments, the phosphorescent aluminate particles may have the average particle size ranging from 5, 10, 15 or 20 to 10, 15, 20 or 25 $\mu$m without any limitations.

As used herein, the coefficient of variation or relative standard deviation is expressed as a percentage and defined as the ratio of the particle size standard deviation ($\sigma$) to the particle size mean ($\mu$) multiplied by 100. In a preferred embodiment, the phosphorescent strontium aluminate particles have a coefficient of variation of less than 50%, preferably less than 40%, preferably less than 30%, preferably less than 20%, preferably less than 15%, preferably less than 10%. In a preferred embodiment, the phosphorescent strontium aluminate particles have a particle size distribution ranging from 10% of the average particle size to 200% of the average particle size, preferably 50-150%, preferably 75-125%, preferably 80-120%, preferably 90-110%. Other ranges are also possible.

In an embodiment, the phosphorescent aluminate particles comprise a rare earth element doped strontium aluminate. This combination may be effective for phosphorescent applications. Strontium aluminate, known for its strong luminescence, is further enhanced by doping with rare earth elements. This doping process improves the intensity and duration of the phosphorescence, making the resultant phosphorescent aluminate particles ideal for applications requiring long-lasting luminescence.

In some embodiments, Strontium aluminate having a formula of $SrAl_2O_4$ is a nonflammable, pale yellow, monoclinic crystalline powder. In some embodiments, strontium aluminate may be present in other formulae such as $SrAl_4O_7$ with a monoclinic crystalline structure, $Sr_3Al_2O_6$ with a cubic crystalline structure, $SrAl_{12}O_{19}$ with a hexagonal crystalline structure, and $Sr_4Al_{14}O_{25}$ with an orthorhombic crystalline structure. In one or more embodiments, the phosphorescent strontium aluminate particles used herein comprise strontium aluminate with a formula of $SrAl_2O_4$. It is equally envisaged that strontium aluminate with other formulae including, but not limited to, $SrAl_4O_7$, $Sr_3Al_2O_6$, $SrAl_{12}O_{19}$, and $Sr_4Al_{14}O_{25}$ may be used in addition to, or in lieu of $SrAl_2O_4$.

In an embodiment, the rare earth element is at least one selected from the group consisting of cerium, dysprosium, europium, and neodymium. The selection of the rare earth elements such as cerium, dysprosium, europium, and neodymium for doping in the strontium aluminate particles enhances the composition. Each of these elements contributes uniquely to the luminescent properties of the phosphorescent aluminate particles, such as for enhancing brightness and afterglow, and/or influencing the duration and intensity of the luminescence. This approach allows for fine-tuning the phosphorescent properties, ensuring that the composition meets specific requirements for intensity and duration of the glow, depending on the applications like traffic signage and safety markers. Exemplary rare earth element doped strontium aluminates include, but are not limited to, cerium doped strontium aluminate, europium doped strontium aluminate, europium and neodymium doped strontium aluminate, and europium and dysprosium doped strontium aluminate (e.g., $Sr_{0.95}Eu_{0.02}Dy_{0.0}Al_2O_4$, and $Sr_{3.84}Eu_{0.06}Dy_{0.10}Al_{14}O_{25}$). In one embodiment, the rare earth element may be present at a molar amount of 2-15 mol %, preferably 3-10 mol %, more preferably 4-8 mol % relative to the amount of strontium aluminate. However, in certain embodiments, the molar amount of the rare earth element may be less than 2 mol % or greater than 15 mol % relative to the amount of strontium aluminate.

In an embodiment, the rare earth element doped strontium aluminate further comprises a promoter selected from the group consisting of boron, lithium, sodium, potassium, magnesium, calcium, barium, chromium, and manganese. In some embodiments, incorporating the promoter like boron, lithium, sodium, potassium, magnesium, calcium, barium, chromium, or manganese into the rare earth element doped strontium aluminate may enhance its phosphorescent properties. These promoters may interact at a molecular level to optimize the luminescence efficiency, stability, and duration. Each promoter brings distinct characteristics, such as improving charge transfer or altering the wavelength of emitted light. This allows the composition to provide a tailored approach to achieve desired luminescent properties, depending on the applications.

Exemplary rare earth element doped strontium aluminates further comprising a promoter include, but are not limited to, cerium doped strontium aluminate promoted by magnesium, cerium doped strontium aluminate promoted by manganese, and europium and dysprosium doped strontium aluminate promoted by boron, lithium, sodium, potassium, magnesium, calcium, barium, or chromium. In one embodiment, the promoter may be present at a molar amount of 0.005-5 mol %, preferably 0.05-1 mol %, more preferably 0.1-0.5 mol % relative to the amount of strontium aluminate. However, in certain embodiments, the molar amount of the promoter may be less than 0.005 mol % or greater than 5 mol % relative to the amount of strontium aluminate. When present, the promoter may be doped on strontium aluminate.

Photophysical properties of phosphorescent aluminate particles including absorption-emission profile, phosphorescence lifetime, and quantum yield may be dependent on various factors including molecular formula of strontium aluminate, chemical identities of the dopant and the promoter, internal crystal structure (e.g., crystal packing) of the phosphorescent aluminate particles, and particle size of the phosphor. In one embodiment, the phosphorescent aluminate particles have a phosphorescence emission peak of 400-700 nm, preferably 425-675 nm, preferably 450-650 nm, preferably 475-625 nm, preferably 500-600 nm, preferably 525-575 nm at an excitation wavelength of 200-425 nm, preferably 225-400 nm, preferably 250-375 nm, preferably 275-350 nm, preferably 300-325 nm. In one embodiment, the phosphorescent aluminate particles used herein have a phosphorescence lifetime ranging from 0.1-40 hours, preferably 1-20 hours, preferably 2-15 hours, preferably 3-10 hours, preferably 4-8 hours. In certain embodiments, the phosphorescent aluminate particles have a phosphorescence lifetime less than 0.1 hour or greater than 40 hours.

As used herein, quantum yield ($\Phi$) refers to the phosphorescence quantum yield and gives the efficiency of the phosphorescence process. It is defined as the ratio of the number of photons emitted relative to the number of photons absorbed. In one embodiment, the phosphorescent aluminate particles used herein have a quantum yield in a range of 0.02-0.9, preferably 0.05-0.8, preferably 0.1-0.7, preferably 0.2-0.6, preferably 0.3-0.5 for phosphorescence emission peak of 400-700 nm, preferably 425-675 nm, preferably 450-650 nm, preferably 475-625 nm, preferably 500-600 nm, preferably 525-575 nm at an excitation wavelength of 200-425 nm, preferably 225-400 nm, preferably 250-375 nm, preferably 275-350 nm, preferably 300-325 nm. Other ranges are also possible.

The phosphorescent aluminate particles used herein may be prepared by techniques generally known to those skilled in the art including, but not limited to, sol-gel process, chemical precipitation, hydrothermal co-precipitation, solid-state reaction, and combustion synthesis technique. Alternatively, the phosphorescent aluminate particles used herein may be available from commercial vendors including, without limitation, Sigma Aldrich, Alfa Aesar, United Mineral and Chemical Corp., and Techno Glow Products.

In an embodiment, the curable thermoset resin comprises an epoxy component and an amine curing agent. In some embodiments, the epoxy component provides the foundational structure for the curable thermoset resin, providing adhesive properties and mechanical strength. Further, the amine curing agent is used to harden or cure the epoxy component in the curable thermoset resin, forming a strong matrix. This combination ensures a stable and durable binder for the phosphorescent aluminate particles, enhancing the overall performance and longevity of the composition.

In some embodiments, the curable thermoset resin may be present in the flowable luminescent coating composition at a concentration of 10 to 80%, preferably 20 to 75%, preferably 30 to 70%, preferably 40 to 65%, or even more preferably 45 to 60%, relative to a total weight of the flowable luminescent coating composition. Other ranges are also possible.

In the present embodiment, the epoxy component comprises at least one resin selected from the group consisting of a bisphenol A epoxy resin, a bisphenol F epoxy resin, a novolak epoxy resin, an aliphatic epoxy resin, a glycidylamine epoxy resin, and an epoxidized vegetable oil. That is, the epoxy component in the curable thermoset resin is a blend of one or more resins, including the bisphenol A epoxy resin, the bisphenol F epoxy resin, the novolak epoxy resin, the aliphatic epoxy resin, the glycidylamine epoxy resin, and the epoxidized vegetable oil. Each of these resins imparts unique properties to the composition, such as mechanical strength, chemical resistance, thermal stability, weathering properties, toughness, and the like. Herein, the epoxidized vegetable oil, being bio-based, also adds an eco-friendly aspect. This diverse selection allows for tailoring the properties of the epoxy component, and thereby the curable thermoset resin, to specific application needs, ensuring optimal performance for the composition.

Further, in the present embodiment, the amine curing agent comprises at least one selected from the group consisting of piperazine, aminoethylpiperazine, pentaethylenehexamine (PEHA), ethylenediamine, ethyleneimine, diethylenetriamine (DETA), hexaethyleneheptamine (HEHA), tetraethylenepentamine (TEPA), and triethylenetetramine (TETA). Each of these amine curing agents helps in the curing process of the epoxy component in the curable thermoset resin. These amine curing agents impart specific properties to the curing process, such as reaction rate, cross-linking density, and mechanical flexibility and strength. The choice of a particular amine curing agent or combination thereof allows for customization of final characteristics of the curable thermoset resin, to achieve a desired balance between flexibility, strength, and curing time for a cured coating formed using the composition.

In the present embodiment, a volume ratio of the epoxy component and the amine curing agent is in a range of 1:1 to 10:1, preferably 2:1 to 9:1, preferably 3:1 to 8:1, preferably 4:1 to 7:1, or even more preferably 5:1 to 6:1. Other ranges are also possible. The specified volume ratio of the epoxy component to the amine curing agent, ranging from 1:1 to 10:1, is chosen for achieving the desired characteristics in the curable thermoset resin. This volume ratio ensures the right balance between the epoxy component and the amine curing agent, affecting the cross-linking density, curing time, and mechanical properties of the curable thermoset resin. A lower volume ratio may lead to under-cured resin, while a higher volume ratio may result in over-cured resin. This flexibility in the volume ratio allows for customization based on the specific application requirements of a cured coating formed using the composition.

In an embodiment, the filler material is at least one selected from the group consisting of fused silica, crystalline silica, glass powder, alumina, calcium carbonate, barium sulfate, barium titanate, talc, clay, magnesium carbonate, aluminum oxide, aluminum hydroxide, magnesium hydroxide, and mica. Such options for the filler material offer a range of properties to enhance the composition. Each of these options for the filler material provides different attributes, such as improving mechanical strength, thermal stability, and abrasion resistance, or modifying the flow properties for optimal application of the composition. The choice of the filler material may also impact the overall density and appearance of the cured coating formed using the composition, allowing for customization based on specific application needs.

In some embodiments, the filler thermoset resin may be present in the flowable luminescent coating composition at a concentration of 1 to 15%, preferably 2 to 12%, preferably 3 to 9%, preferably 4 to 6%, or even more preferably about 5%, relative to a total weight of the flowable luminescent coating composition. Other ranges are also possible.

In an embodiment, each of the two or more solvents are independently selected from the group consisting of a ketone solvent, an ester solvent, an alcohol solvent, an amide solvent, an ether solvent, an aromatic hydrocarbon solvent, and water. The selection of solvents, from these categories, allows for tailoring the flowable luminescent coating composition. Each solvent type offers distinct properties like evaporation rate, solubility, and influence on the viscosity of the composition. This flexibility in choosing solvents allows for fine-tuning properties of the composition, ensuring optimal performance in terms of ease of application, drying time, and the final texture of a cured coating formed using the composition. Such variety of solvents also enables adjustments based on environmental considerations and specific use cases.

In the present embodiment, the two or more solvents may be a benzene solvent and water. In some embodiments, a volume ratio of the benzene solvent and water is in a range of 100:1 to 1:1, preferably 50:1 to 5:1, preferably 30:1 to 10:1, or even more preferably about 20:1. Other ranges are also possible. In the composition, the benzene solvent is effective in dissolving various components, while the water may affect viscosity of the composition and a drying time (due to evaporation rate) of a coating formed using the composition. The specified ratio ensures an optimal balance to allow for control over properties of the composition for different application conditions and requirements.

In some embodiments, the two or more solvents may be present in the flowable luminescent coating composition at a concentration of 5 to 50%, preferably 8 to 40%, preferably 11 to 30%, preferably 14 to 20%, or even more preferably about 15%, relative to a total weight of the flowable luminescent coating composition. Other ranges are also possible.

As used herein, a "plasticizer" is an additive that increases the plasticity or fluidity of slurry. In an embodiment, the plasticizer is at least one selected from the group consisting of a phthalate-based plasticizer, a polyol-based plasticizer, and a citrate-based plasticizer. Each of these types of the plasticizer offers specific advantages for achieving desired characteristics for the composition. For example, the phthalate-based plasticizer is known for its effectiveness in enhancing flexibility, the polyol-based plasticizer may impart low volatility and high stability, and the citrate-based plasticizer may be preferred for its biodegradability and low toxicity. The choice of the plasticizer may affect flexibility, durability, and environmental impact of the composition, ensuring that it meets specific application and safety requirements. Exemplary plasticizers include, but are not limited to, a polycarboxylate, e.g. a polycarboxylate derivative with polyethylene oxide side chains, a polycarboxylate ether (PCE) plasticizer, such as the commercially available Glenium 51®, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

In some embodiments, the flowable luminescent coating composition described herein comprise less than 1 wt % of plasticizer, preferably less than 0.05 wt % of plasticizer, preferably less than 0.01 wt %, more preferably less than 0.001 wt % of plasticizer, relative to a total weight of the flowable luminescent coating composition. Other ranges are also possible.

In an embodiment, the stabilizer is at least one selected from the group consisting of an antioxidant, a light stabilizer, and a heat stabilizer. Again, each of these types of the stabilizer offers specific advantages for achieving desired characteristics for the composition. For example, the antioxidant prevents degradation from oxygen exposure, enhancing the longevity of the composition when applied as a coating; the light stabilizer protects against UV radiation, as required for outdoor applications; and the heat stabilizer ensure the coating formed using the composition remains stable under varying temperature conditions. The use of any one or combination of these stabilizers helps in maintaining integrity, performance, and appearance of the composition over time, especially in challenging environmental conditions.

In some embodiments, the flowable luminescent coating composition described herein comprise less than 1 wt % of stabilizer, for instance, less than 0.05 wt % of stabilizer, preferably less than 0.01 wt %, more preferably less than 0.001 wt % of stabilizer, relative to a total weight of the flowable luminescent coating composition. Other ranges are also possible.

In the present examples, the composition may provide a glow of Yellow-Green color (based on current configuration). The composition, in itself, may have an appearance of yellowish flowable composition with a specific gravity of 3 to 5 $g/cm^3$, preferably 3.1 to 4.5 $g/cm^3$, preferably 3.2 to 4 $g/cm^3$, preferably 3.3 to 3.8, or even more preferably about 3.6 $g/cm^3$. Other ranges are also possible. The composition is non-toxic and non-radioactive. The composition may have a lifespan of more than 15 years under sealed, dry and cool conditions. While, it has been discussed that the composition may be excited (charged) by UV light, in other examples, the composition may alternatively be excited by daylight, laser light, incandescent light, white-fluorescent light, LED light, etc., without departing from the spirit and the scope of the present disclosure. As used herein, the daylight may be natural solar light or simulated solar light. Exemplary light sources include, but are not limited to, a xenon lamp such as a xenon arc lamp and a xenon flash lamp, a mercurial lamp, a metal halide lamp, an LED lamp, a solar simulator, and a halogen lamp. In certain embodiments, two or more light sources may be used. In another preferred embodiment, a simulated solar light may be used as the light source. The light source used to excite the glow-in-the-dark film may have an intensity of 25-500 watts, 50-300 watts, 100-200 watts, or about 150 watts at a position 5-100 cm, 10-75 cm, or 20-50 cm away from the closest surface of the GiD film. In one or more embodiments, the duration of excitation ranges from 2-30 minutes, preferably 5-20 minutes, more preferably 10-15 minutes. Other ranges are also possible.

Referring now to FIG. 1, the present disclosure also provides a glow-in-the-dark (GiD) film (as represented by reference numeral 100 in the exemplary illustration). The GiD film 100 includes the flowable luminescent coating composition, as discussed in the preceding paragraphs, in a cured form. The GiD film 100, made from the composition, is formed by curing of the composition in the form of a thin layer. The GiD film 100 exhibits glow-in-the-dark properties. This luminescence is primarily due to the phosphorescent aluminate particles in the composition, which absorb and emit light, providing prolonged visibility in low-light conditions. This feature is particularly valuable in safety and visibility applications, making the GiD film 100 suitable for diverse applications such as traffic and safety signage, emergency exit markers, and other areas where high visibility is required.

The composition used in the GiD film 100, which includes a balanced mixture of the curable thermoset resin, the filler material, the two or more solvents, the plasticizer, the stabilizer, and the phosphorescent aluminate particles, provides it with the necessary physical and chemical properties. The curable thermoset resin in the composition cures to form a robust matrix that holds the phosphorescent aluminate particles in the GiD film 100, ensuring stability and durability. The plasticizer provides flexibility, preventing cracking and peeling of the GiD film 100 in various environmental conditions. The stabilizer protects the GiD film 100 from degradation due to environmental factors. This ensures that the GiD film 100 maintains its structural integrity and luminescent properties over time. This versatility and durability make the GiD film 100 suitable for a wide range of applications beyond traffic signs, including architectural, decorative, and emergency applications.

Figures 2A, 2B:
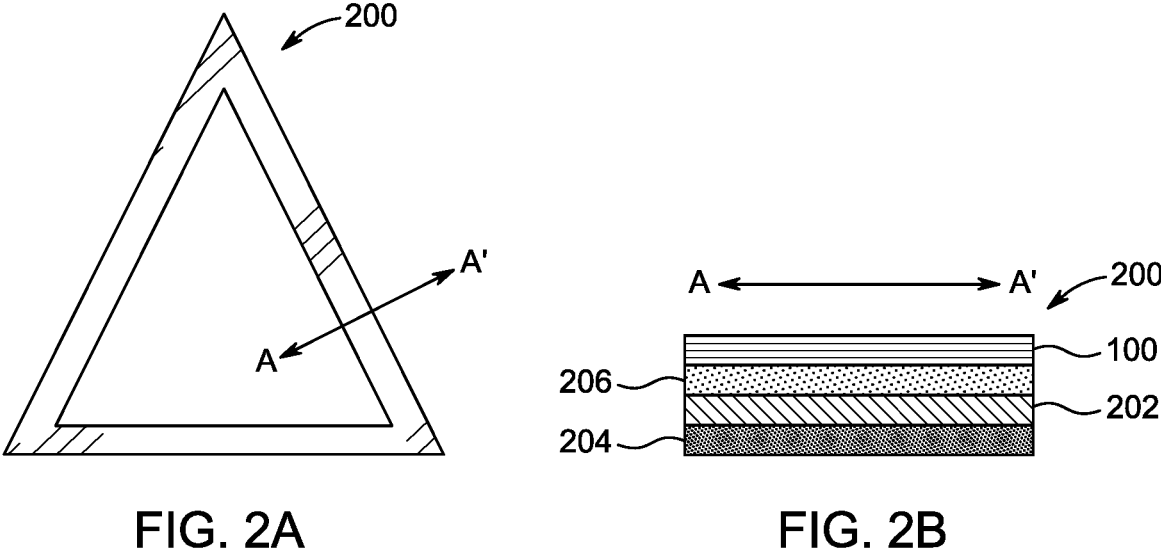
FIG. 2A is an exemplary diagram of a GiD traffic sign incorporating the GiD film, according to certain embodiments.
FIG. 2B is an exemplary cross-section view of the GiD traffic sign along AA' of FIG. 2A, according to certain embodiments.

Referring to FIG. 2A, the present disclosure further provides a GiD traffic sign (as represented by reference numeral 200 in the exemplary illustration). FIG. 2B illustrates a cross-sectional view of the GiD traffic sign 200 along A-A' of FIG. 2A. As illustrated, in combination of FIGS. 2A and 2B, the GiD traffic sign 200 incorporates a layered structure, each layer serving a distinct purpose. The GiD traffic sign 200 includes a polymer film 202 at least partially covering a surface of a metal substrate 204. In some embodiments, the metal substrate 204 forms the base, onto which the polymer film 202 is applied to provide durability and environmental resistance. In an example, the polymer film 202 is an acrylic or a PET (polyethylene terephthalate) film. The GiD traffic sign 200 also includes a binder layer 206 at least partially covering a surface of the polymer film 202. The GiD traffic sign 200 further includes the GiD film 100 (as discussed) at least partially covering a surface of the binder layer 206. The at least partial covering of the polymer film 202 by the binder layer 206 ensures strong adhesion between the polymer film 202 and the GiD film 100. The GiD film 100, which forms the top layer, provides the necessary luminescent functionality, imparting the GiD traffic sign 200 with visibility for use in low-light conditions. This multi-layered construction not only enhances visibility but also ensures its longevity and resistance to weathering, making the GiD traffic sign 200 an ideal solution for modern traffic signage needs.

In the exemplary illustration of FIG. 2A, the GiD traffic sign 200 is depicted as a triangular sign which is indicative of a common road warning sign. In some other embodiments, the GiD traffic sign 200 may be at least one of a rectangular sign, an octagonal sign, and a circular sign. Other shapes are also possible. The GiD traffic sign 200 with the triangular shape acts as a universal symbol for caution on the road. As illustrated, the GiD film 100, cut to conform to edges of the triangular shape, and placed as the topmost layer, serves as the interface with the environment. The phosphorescent property of the GiD film 100 enables it to absorb light (e.g., during the day) and emit light during darker hours, providing a consistent glow. This ensures that the GiD traffic sign 200 acts as cautionary sign not only during daylight but also during nighttime, for alerting and guiding drivers effectively, thereby contributing to a safer and more efficient road network.

Figure 3B:
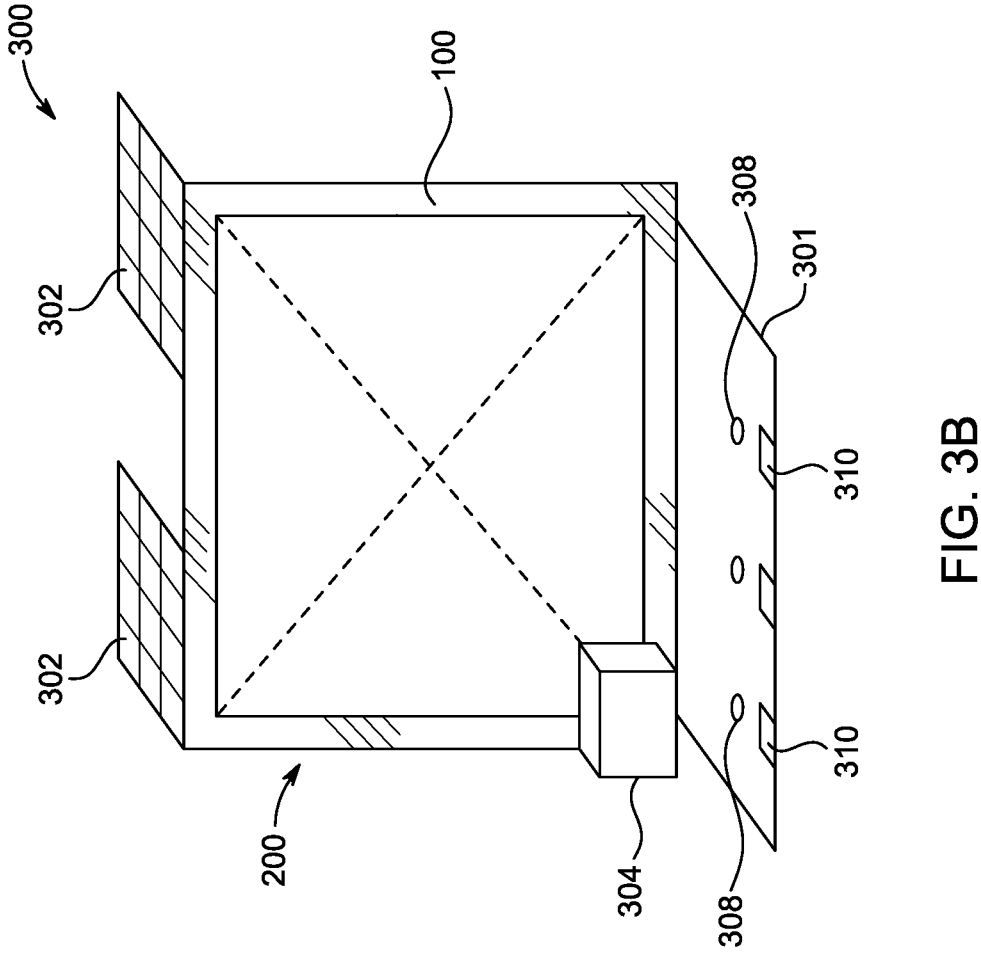
FIG. 3B is an exemplary diagram of the GiD system incorporating the GiD traffic sign, according to another embodiment.
Figure 3A:
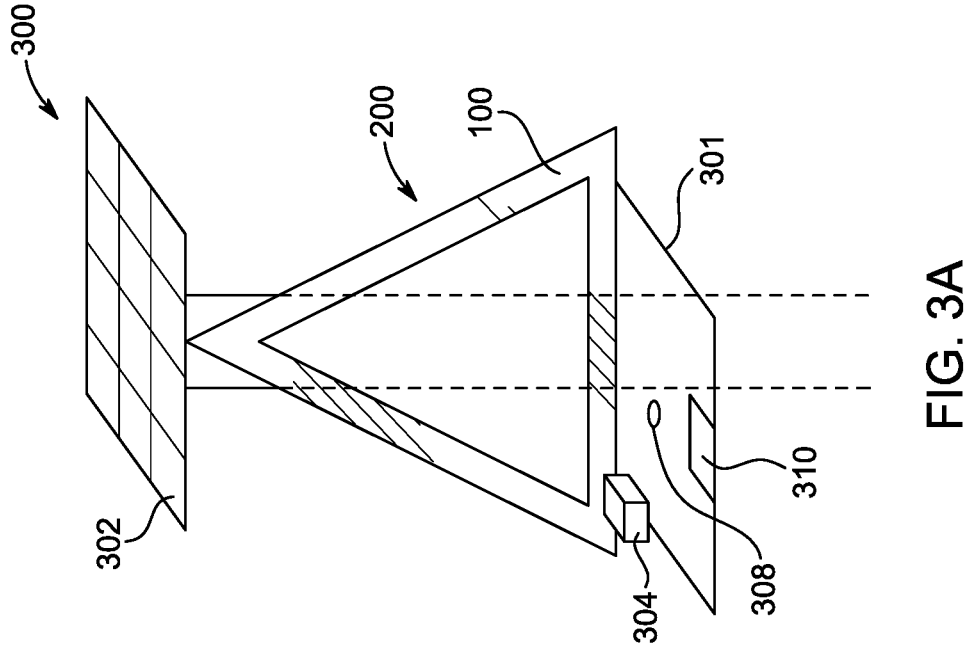
FIG. 3A is an exemplary diagram of a GiD system incorporating the GiD traffic sign, according to one embodiment.
Figure 3C:
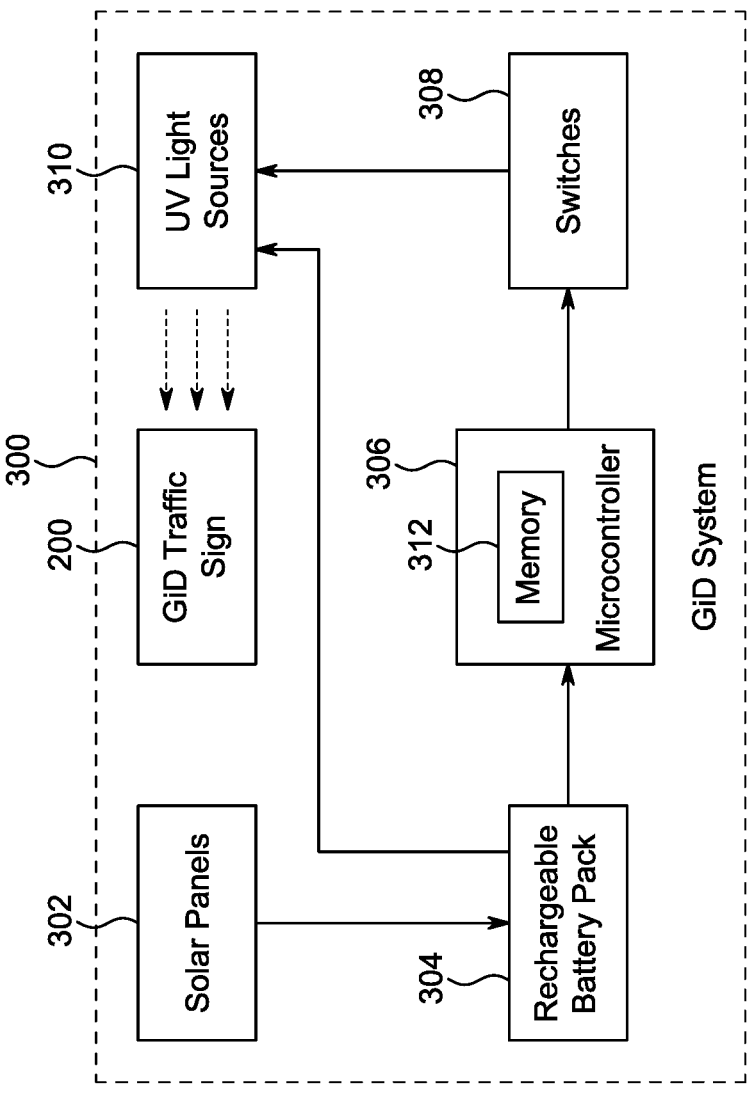
FIG. 3C is an exemplary schematic block diagram of the GiD system, according to certain embodiments.

Referring to FIGS. 3A-3C, the present disclosure further provides a GiD system (as represented by reference numeral 300 in the exemplary illustrations). The GiD system 300 includes the GiD traffic sign 200 (as described in the preceding paragraphs). In some embodiments, FIG. 3A depicts the GiD system 300 incorporating the GiD traffic sign 200 of triangular shape (as also shown in FIG. 2A), while FIG. 3B depicts the GiD system 300 incorporating the GiD traffic sign 200 of square/rectangular shape. These variations demonstrate the adaptability of the GiD system 300 to different geometries of the GiD traffic sign 200, ensuring the luminescent property of the GiD film 100 therein is maintained across various traffic sign designs for improved safety and visibility.

The GiD system 300 is an integrated assembly designed to provide the functionality of the GiD traffic sign 200. As illustrated, the GiD system 300 includes a base plate 301 onto which its various components are supported and/or mounted. The GiD system 300 includes a plurality of solar panels 302. The plurality of solar panels 302 are supported on the base plate 301. In the present examples, the plurality of solar panels 302 are shown to mounted on a pole or the like which, in turn, may be supported on the base plate 301. The plurality of solar panels 302 capture solar energy to provide power to components of the GiD system 300. The GiD system 300 also includes a rechargeable battery pack 304. The rechargeable battery pack 304 stores the energy collected by the plurality of solar panels 302, providing a consistent power supply for the GiD system 300, ensuring the GiD traffic sign 200 remains operational after daylight hours. This contributes to self-sustainability and reduces the need for external power sources for the GiD system 300.

Further, as illustrated in the schematic block diagram of FIG. 3C, the GiD system 300 includes a microcontroller 306. The microcontroller 306 manages power flow from the rechargeable battery pack 304 to other components in the GiD system 300. Also, as illustrated, the GiD system 300 includes a plurality of switches 308 and a plurality of UV light sources 310. Herein, the plurality of UV light sources 310 are in optical communication with the GiD traffic sign 200. For this purpose, the plurality of UV light sources 310 are arranged and directed in a manner to emit UV light towards the GiD traffic sign 200, for "recharging" the phosphorescent aluminate particles present in the flowable luminescent coating composition in the GiD traffic sign 200. The plurality of switches 308 facilitate the operational control of the UV light sources 310, allowing for the precise management of illumination levels of the GiD traffic sign 200.

In an embodiment, each of the plurality of UV light sources 310 has a wavelength of maximum intensity in a range of 200 and 550 nanometers (nm), preferably 250 to 500 nm, preferably 300 to 450 nm, preferably 350 to 400 nm, preferably 365 to 395 nm, or even more preferably 370 to 390 nm. Other ranges are also possible. As discussed, the plurality of UV light sources 310 are responsible in the GiD system 300 for activating the phosphorescent properties of the GiD traffic sign 200. Operating within the ultraviolet spectrum, particularly between 365 nm and 395 nm, the UV light sources 310 are tuned to the wavelength range that ensures the phosphorescent materials in the GiD film 100 of the GiD traffic sign 200 absorb the maximum amount of energy. This specific range recharges the GiD traffic sign 200 efficiently, providing the necessary energy to enable a sustained glow during nighttime or low-light conditions. In an example implementation, the microcontroller 306 may be configured to control the switches 308 for powering ON the UV light sources 310 for 60-120 seconds after about every 20 minutes interval for recharging purposes.

In the GiD system 300, as illustrated, each of the plurality of solar panels 302 is operatively connected to the rechargeable battery pack 304, and the rechargeable battery pack 304 is operatively connected to the microcontroller 306. Herein, the plurality of solar panels 302 are connected to the rechargeable battery pack 304, ensuring that the solar energy collected is efficiently stored. This stored energy is then regulated by the microcontroller 306, which controls the charging cycles and energy distribution to the plurality of UV light sources 310. Furthermore, in the GiD system 300, each of the plurality of UV light sources 310 is operatively connected to the microcontroller 306 via each of the plurality of switches 308. Herein, the microcontroller 306 comprises a memory 312 for saving or installing an application program, or a software program, where the application program or the software program from an internet or a cloud server is downloaded for controlling ON and OFF of each of the plurality of switches 308. That is, the UV light sources 310 are digitally connected to the microcontroller 306 through individual switches 308. This architecture allows the microcontroller 306, which is equipped with the memory 312 for software programs, to precisely control the activation of the UV light sources 310. The software for such control may be updated remotely via downloads from the internet or cloud servers, enabling dynamic control and adaptability of the GiD system 300.

This architecture of the GiD system 300 allows for customized operational schedules, enhancing the functionality of the GiD system 300 for illumination of the GiD traffic sign 200 as per different application conditions and safety requirements. The possible automated control ensures the GiD traffic sign 200 is efficiently and effectively 'charged' by the UV light for maximum visibility during nighttime. Further, the remote control capability is beneficial for large-scale implementations or in locations that are difficult to access, offering ease of maintenance and operation. Furthermore, the adaptability of the GiD system 300, made possible by software updates, ensures that it can respond effectively to varying environmental conditions and usage requirements.

The present disclosure offers advancements in traffic sign illumination technology. The flowable luminescent coating composition, with its mixture of resins, fillers, and phosphorescent particles, offers a durable and long-lasting glow, as required for visibility in low-light conditions. The resulting GiD film 100, when applied as the GiD traffic sign 200 provides sufficient illumination and longevity reducing the need for electrical lighting and frequent maintenance, while being cost-effective compared to traditional LED lighting. Furthermore, the GiD system 300 with integration of the solar panels 302 and the UV light sources 310 provides sustainability, reducing reliance on traditional power grids and enhancing energy efficiency. Furthermore, the ability of the GiD system 300 to adjust intensity and duration of the glow according to requirements, allows to provide customized solutions.

Figure 4:
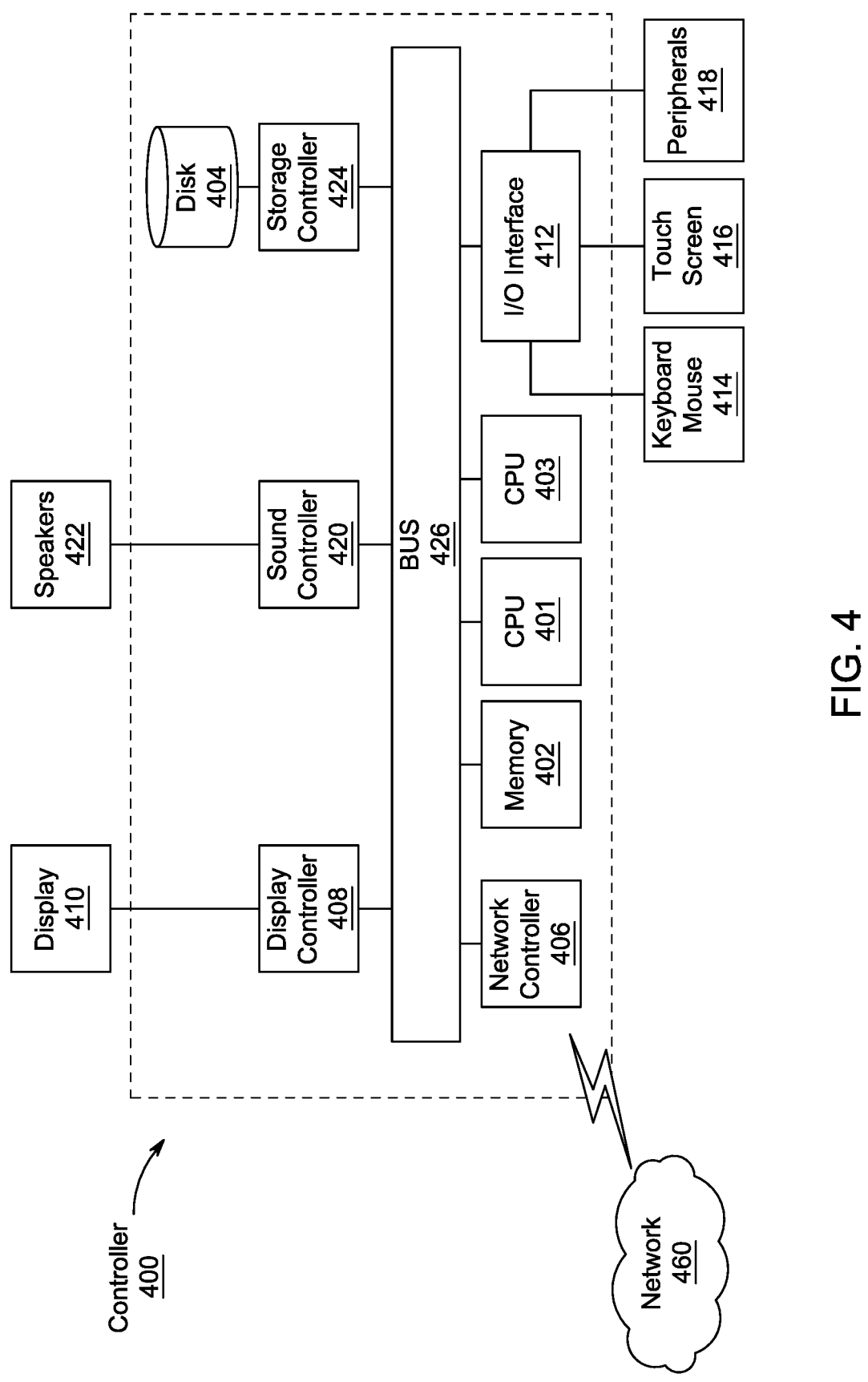
FIG. 4 is an illustration of a non-limiting example of details of computing hardware used in the computing system, according to certain embodiments.

Next, further details of the hardware description of the computing environment according to exemplary embodiments is described with reference to FIG. 4. In FIG. 4, a controller 400 is described as representative of the microcontroller 306 of the GiD system 300 of FIG. 3C in which the controller is a computing device which includes a CPU 401 which performs the processes described above/below. The process data and instructions may be stored in memory 402. These processes and instructions may also be stored on a storage medium disk 404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 401, 403 and an operating system such as Microsoft Windows 7, Microsoft Windows 10, Microsoft Windows 11, UNIX, Solaris, LINUX, Apple MAC-OS, and other systems known to those skilled in the art.

The hardware elements in order to achieve the computing device may be realized by various circuitry elements, known to those skilled in the art. For example, CPU 401 or CPU 403 may be a Xenon or Core processor from Intel of America or an Opteron processor from AMD of America, or may be other processor types that would be recognized by one of ordinary skill in the art. Alternatively, the CPU 401, 403 may be implemented on an FPGA, ASIC, PLD or using discrete logic circuits, as one of ordinary skill in the art would recognize. Further, CPU 401, 403 may be implemented as multiple processors cooperatively working in parallel to perform the instructions of the inventive processes described above.

The computing device in FIG. 4 also includes a network controller 406, such as an Intel Ethernet PRO network interface card from Intel Corporation of America, for interfacing with network 460. As can be appreciated, the network 460 can be a public network, such as the Internet, or a private network such as an LAN or WAN network, or any combination thereof and can also include PSTN or ISDN subnetworks. The network 460 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the computing device such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the computing device. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 5.

Figure 5:
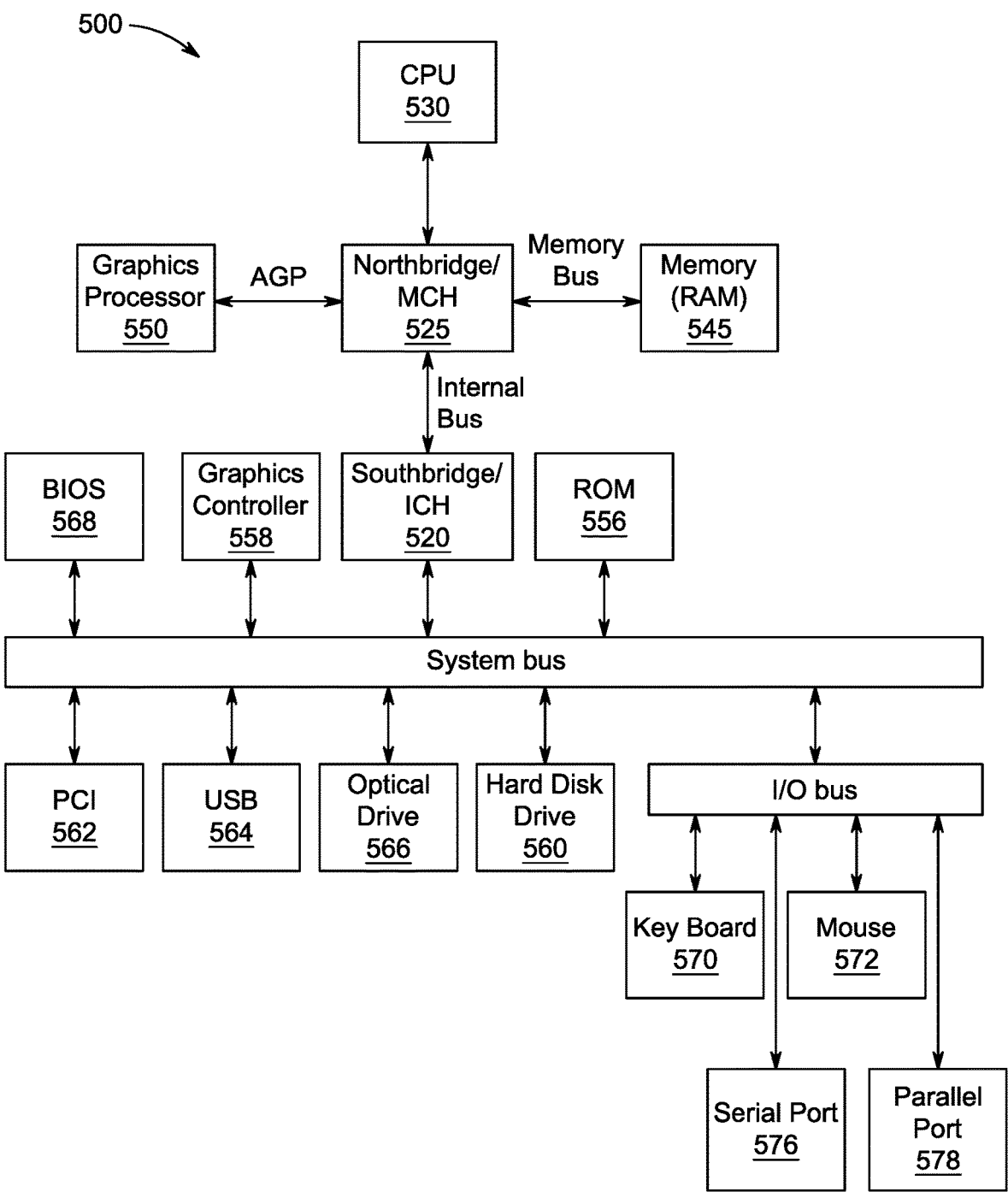
FIG. 5 is an exemplary schematic diagram of a data processing system used within the computing system, according to certain embodiments.

FIG. 5 shows a schematic diagram of a data processing system, according to certain embodiments, for performing the functions of the exemplary embodiments. The data processing system is an example of a computer in which code or instructions implementing the processes of the illustrative embodiments may be located.

In FIG. 5, data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and even may be implemented using one or more heterogeneous processor systems.

Figure 6:
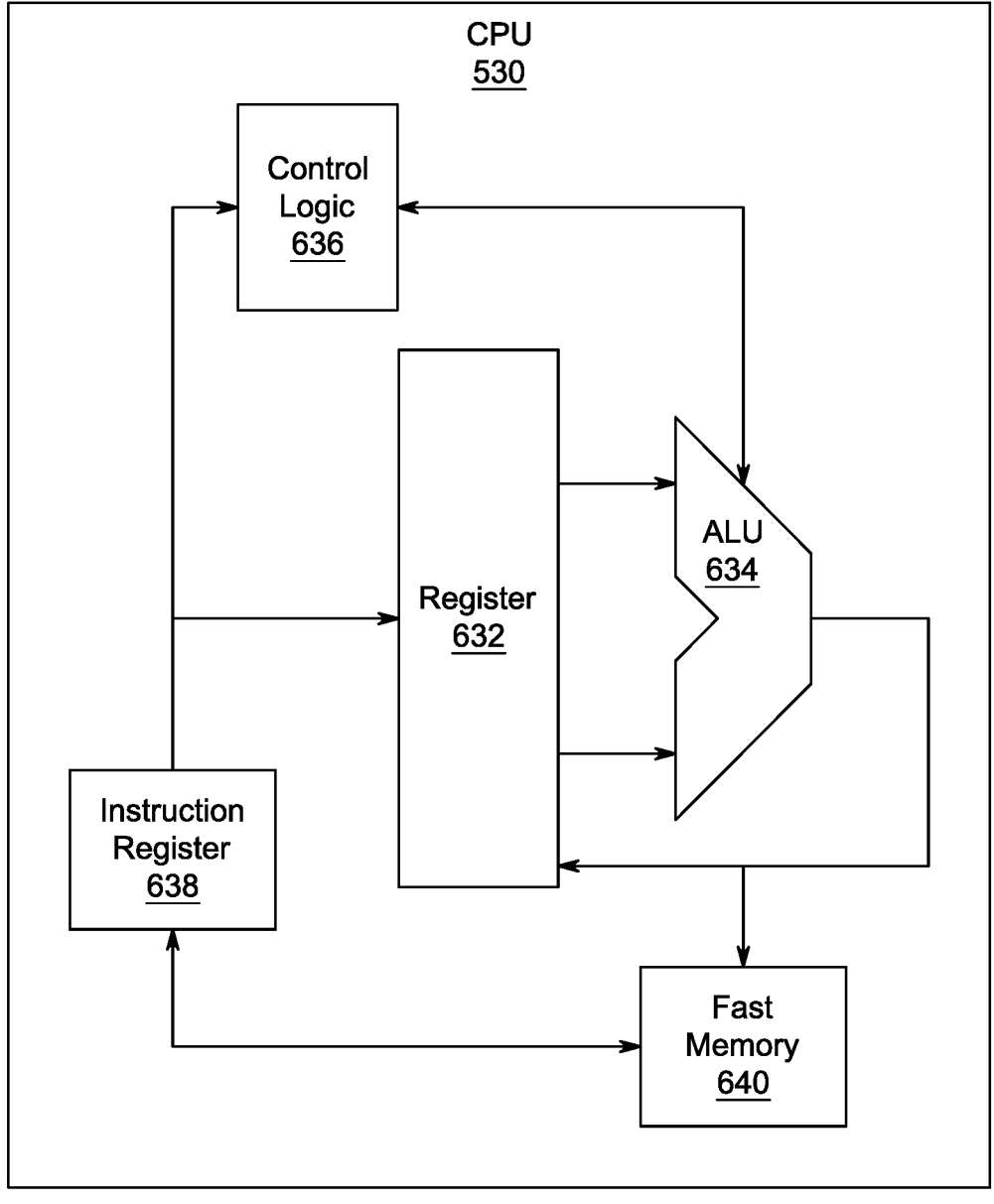
FIG. 6 is an exemplary schematic diagram of a processor used with the computing system, according to certain embodiments.

For example, FIG. 6 shows one implementation of CPU 530. In one implementation, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain implementations, the instruction set architecture of the CPU 530 can use a reduced instruction set architecture, a complex instruction set architecture, a vector processor architecture, a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 500 can include that the SB/ICH 520 is coupled through a system bus to an I/O Bus, a read only memory (ROM) 556, universal serial bus (USB) port 564, a flash binary input/ output system (BIOS) 568, and a graphics controller 558. PCI/PCIe devices can also be coupled to SB/ICH 588 through a PCI bus 562.

The PCI devices may include, for example, Ethernet adapters, add-in cards, and PC cards for notebook computers. The Hard disk drive 560 and CD-ROM 566 can use, for example, an integrated drive electronics (IDE) or serial advanced technology attachment (SATA) interface. In one implementation the I/O bus can include a super I/O (SIO) device.

Further, the hard disk drive (HDD) 560 and optical drive 566 can also be coupled to the SB/ICH 520 through a system bus. In one implementation, a keyboard 570, a mouse 572, a parallel port 578, and a serial port 576 can be connected to the system bus through the I/O bus. Other peripherals and devices that can be connected to the SB/ICH 520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 7:
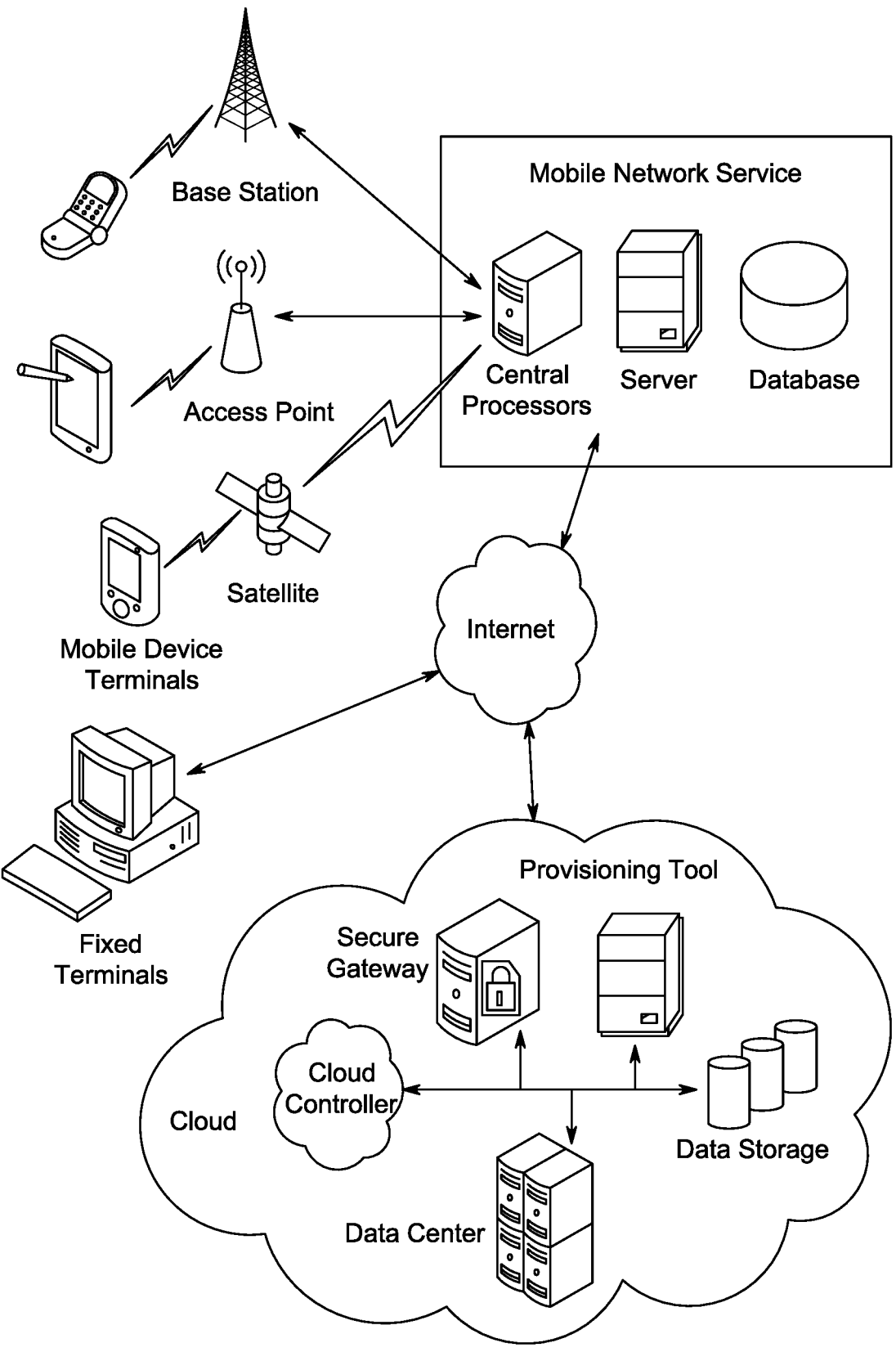
FIG. 7 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 7, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A flowable luminescent coating composition, comprising:
   a liquid mixture comprising:
      a curable thermoset resin,
      two or more solvents,
      a plasticizer, and
      a stabilizer;
   a filler material; and
   phosphorescent aluminate particles;
   wherein the phosphorescent aluminate particles are present in the flowable luminescent coating composition at a concentration of 30 to 70 wt. % based on a total weight of the flowable luminescent coating composition;
   wherein the phosphorescent aluminate particles and the filler material are suspended in the liquid mixture; and
   wherein the flowable luminescent coating composition in a cured form has an intensity of glow of 1-50 candelas per square meter for a period of 0.1 to 2 hours upon excitation with ultraviolet (UV) light for 5 to 120 seconds.

2. The flowable luminescent coating composition of claim 1, wherein the phosphorescent aluminate particles have an average particle size of 5 to 25 micrometers (μm).

3. The flowable luminescent coating composition of claim 1, wherein the phosphorescent aluminate particles comprise a rare earth element doped strontium aluminate.

4. The flowable luminescent coating composition of claim 3, wherein the rare earth element is at least one selected from the group consisting of cerium, dysprosium, europium, and neodymium.

5. The flowable luminescent coating composition of claim 3, wherein the rare earth element doped strontium aluminate further comprises a promoter selected from the group consisting of boron, lithium, sodium, potassium, magnesium, calcium, barium, chromium, and manganese.

6. The flowable luminescent coating composition of claim 1, wherein the curable thermoset resin comprises an epoxy component and an amine curing agent.

7. The flowable luminescent coating composition of claim 6, wherein the epoxy component comprises at least one resin selected from the group consisting of a bisphenol A epoxy resin, a bisphenol F epoxy resin, a novolak epoxy resin, an aliphatic epoxy resin, a glycidylamine epoxy resin, and an epoxidized vegetable oil.

8. The flowable luminescent coating composition of claim 6, wherein the amine curing agent comprises at least one selected from the group consisting of piperazine, aminoethylpiperazine, pentaethylenehexamine (PEHA), ethylenediamine, ethyleneimine, diethylenetriamine (DETA), hexaethyleneheptamine (HEHA), tetraethylenepentamine (TEPA), and triethylenetetramine (TETA).

9. The flowable luminescent coating composition of claim 6, wherein a volume ratio of the epoxy component and the amine curing agent is in a range of 1:1 to 10:1.

10. The flowable luminescent coating composition of claim 1, wherein the filler material is at least one selected from the group consisting of fused silica, crystalline silica, glass powder, alumina, calcium carbonate, barium sulfate, barium titanate, talc, clay, magnesium carbonate, aluminum oxide, aluminum hydroxide, magnesium hydroxide, and mica.

11. The flowable luminescent coating composition of claim 1, wherein each of the two or more solvents are independently selected from the group consisting of a ketone solvent, an ester solvent, an alcohol solvent, an amide solvent, an ether solvent, an aromatic hydrocarbon solvent, and water.

12. The flowable luminescent coating composition of claim 11, wherein the two or more solvents comprise a benzene solvent and water, and wherein a volume ratio of the benzene solvent and water is in a range of 50:1 to 5:1.

13. The flowable luminescent coating composition of claim 1, wherein the plasticizer is at least one selected from the group consisting of a phthalate-based plasticizer, a polyol-based plasticizer, and a citrate-based plasticizer.

14. The flowable luminescent coating composition of claim 1, wherein the stabilizer is at least one selected from the group consisting of an antioxidant, a light stabilizer, and a heat stabilizer.

15. A glow-in-the-dark (GiD) film, comprising the flowable luminescent coating composition of claim 1 in a cured form.

16. A GiD traffic sign, comprising:
a polymer film at least partially covering a surface of a metal substrate;
a binder layer at least partially covering a surface of the polymer film; and
the GiD film of claim 15 at least partially covering a surface of the binder layer.

17. A GiD system, comprising:
the GiD traffic sign of claim 16;
a plurality of solar panels;
wherein the plurality of solar panels are supported on a base plate;
a rechargeable battery pack;
a microcontroller;
a plurality of switches;
a plurality of UV light sources; and
wherein the plurality of UV light sources are directed to emit UV light towards the GiD traffic sign.

18. The GiD system of claim 17, wherein each of the plurality of solar panels is operatively connected to the rechargeable battery pack, and wherein the rechargeable battery pack is operatively connected to the microcontroller.

19. The GiD system of claim 17, wherein each of the plurality of UV light sources is operatively connected to the microcontroller via each of the plurality of switches, and wherein the microcontroller comprises a memory.

20. The GiD system of claim 17, wherein each of the plurality of UV light sources has a wavelength of maximum intensity in a range of 365 and 395 nanometers (nm).

* * * * *